(12) United States Patent
Greetis

(10) Patent No.: US 6,805,023 B2
(45) Date of Patent: Oct. 19, 2004

(54) INTEGRATED RIDER CONTROL SYSTEM FOR HANDLEBAR STEERED VEHICLES

(75) Inventor: Jacques P. Greetis, St. Charles, IL (US)

(73) Assignee: SRAM Corporation, Chicago, IL (US)

( * ) Notice: Subject to any disclaimer, the term of this patent is extended or adjusted under 35 U.S.C. 154(b) by 145 days.

(21) Appl. No.: 10/064,473

(22) Filed: Jul. 17, 2002

(65) Prior Publication Data

US 2002/0194945 A1 Dec. 26, 2002

Related U.S. Application Data

(63) Continuation-in-part of application No. 09/849,114, filed on May 4, 2001, now abandoned, which is a continuation-in-part of application No. 09/544,405, filed on Apr. 6, 2000, now abandoned, which is a continuation-in-part of application No. 09/526,659, filed on Mar. 15, 2000, now Pat. No. 6,588,297.

(51) Int. Cl.[7] .............................................. B62K 21/12
(52) U.S. Cl. ...................................... 74/551.8; 340/432
(58) Field of Search ........................... 74/551.1–551.9, 74/552–558; 340/432, 438, 691.1, 693.5; 180/219

(56) References Cited

U.S. PATENT DOCUMENTS

D301,027 S  *  5/1989  Borromeo ................... D12/178
5,269,196 A  * 12/1993  Rafac ......................... 74/551.1
5,456,481 A    10/1995  Allsop et al. ............. 280/281.1
6,069,788 A  *  5/2000  Masui ......................... 361/683
6,292,952 B1    9/2001  Watters et al. ................. 2/411

FOREIGN PATENT DOCUMENTS

| FR | 2654698 | * | 5/1991 | ................. 74/551.8 |
| FR | 2678231 A1 | * | 12/1992 | ........... B62K/21/12 |
| FR | 2775248 A1 | * | 8/1999 | ........... B62K/21/12 |
| GB | 301636 | * | 12/1928 | ................. 74/551.8 |
| GB | 2138755 A | * | 10/1984 | ........... B62K/21/12 |

* cited by examiner

*Primary Examiner*—Chong H. Kim
(74) *Attorney, Agent, or Firm*—Milan Milosevic; Lisa Wunderlich

(57) ABSTRACT

An integral rider control device mountable to a handlebar steered vehicle. The control device includes an integral support structure having a left end for receiving a left handgrip and a right end for receiving a right handgrip. A central section is disposed between the left end and the right end. A plurality of non-tubular receptacles are formed in the integral support structure between the left end and the right end thereof. Each of the receptacles are configured to receive a respective piece of equipment. The equipment may include controls, displays or accessories. A connecting member is molded into the central section and outwardly extends from the central section. The connecting member pivotally couples the integral support structure to the vehicle along a steering axis of the vehicle.

14 Claims, 4 Drawing Sheets

INTEGRATED RIDER CONTROL SYSTEM FOR HANDLEBAR STEERED VEHICLES

CROSS REFERENCE TO RELATED APPLICATIONS

This application is a continuation-in-part of application Ser. No. 09/849,114 filed on May 4, 2001 now abandonded entitled Integrated Rider Control System For Handlebar Steered Vehicles which is a continuation-in-part of application Ser. No. 09/544,405 filed on Apr. 6, 2000 now abandoned having the same title which is a continuation-in-part of application Ser. No. 09/526,659, filed on Mar. 15, 2000 now is U.S. Pat. No. 6,588,297 and having the same title.

BACKGROUND OF INVENTION

The present invention relates generally to the field of rider control devices for handlebar steered vehicles. More particularly, the invention relates to an integrated rider control system which integrates a handlebar with various controls, accessories and displays and has a connecting member that is insert-molded into the control device for connecting to the vehicle along a steering axis of the vehicle.

Conventional handlebar assemblies typically include a tubular member transversely positioned with respect to the longitudinal axis of the bicycle, motorcycle, or other handlebar steered vehicle. These conventional tubular handlebars can be formed into one of a number of different shapes, such as a straight bar, a U-shape, and a ram horn shape. These handlebar assemblies commonly have additional equipment such as vehicle controls, accessories or displays. Controls typically include devices such as shifters, brakes, etc. Displays can include devices such as shifter displays, computer displays, etc. Accessories typically include devices such as bells, bags, horns, etc. Typically, this equipment is mounted on the tubular handlebar assemblies with clamps, bands, clips or other substantially exposed fasteners. Often the mounting of this equipment on the tubular handlebar is performed on a piece-meal basis.

A representative prior art structure of a handlebar assembly is shown in FIG. 1. The prior art handlebar assembly of FIG. 1 uses a cylindrical tubular metallic handlebar 9 having a plurality of accessories 11 clamped on to the handlebar assembly leaving a number of sharp metal surfaces and fasteners exposed. The equipment mounting on the prior art handlebar structure encroaches into the rider's space and reduces the locations available to the rider for gripping the handlebar assembly. A connecting member 13 between the handlebar and the vehicle is bolted or clamped onto the vehicle.

Existing handlebar assemblies for handlebar steered vehicles and handlebar mounted equipment, however, have a number of further drawbacks. Existing handlebar assemblies provide limited surface area for the mounting of additional equipment. The limited availability of mounting space on existing handlebar assemblies contributes to improper, inefficient or ineffective mounting and location of the additional equipment. The improper mounting configurations of the additional equipment can obstruct the user's view, encroach into the riding space of the rider and reduce the surface area and the number of locations available to the rider for gripping the handlebar assembly. Moreover, the tubular shape of existing handlebar assemblies severely limits the number and types of compatible fasteners for the mounting of the additional equipment to the handlebar assembly.

Further, existing handlebar mounted equipment are usually externally mounted by exposed clamps, clips, cables and fasteners. These existing exposed accessories, controls, displays, clamps and fasteners often include sharp metallic surfaces all of which can, and often do, cause injury to a vehicle user who contacts these devices during operation of the vehicle. The prior art solution has been to employ a cover, such as a soft cap, over the exposed sharp metal surfaces or fasteners. The exposed cables and wires connecting the equipment are clumsy and susceptible to entanglement with and damage by foreign objects during operation of the vehicle. The externally mounted equipment can be easily removed or broken away by thieves or vandals. This susceptibility of existing equipment to theft severely limits the user's ability and freedom to easily store or leave dislodged from their desired positions by contact with the user or a foreign object leading to premature failure or contributing to repeated and excessive readjustment of the equipment.

Accordingly, it would be advantageous to provide a handlebar assembly for handlebar steered vehicles that provides for integrated attachment of various equipment. In particular, it would be advantageous to provide an integral rider control device that integrally and receivably accommodates equipment. What is needed is an integral rider control device that contains includes additional mounting surfaces and receiving ports for equipment. There is a continuing need for an integrated rider control system that ergonomically optimizes the location of hand gripping surfaces and the positioning of equipment such that the riders view is not obstructed and encroachment into the rider's space is minimized. There is a need for a rider control system that is adaptable to a greater variety of fasteners and fastening techniques. It would be advantageous to provide a rider control system that eliminates sharp metallic surfaces projecting from equipment and their fasteners. There is a continuing need for an integrated rider control system that minimizes the amount of exposed cables extending between the equipment. What is needed is an integrated rider control system that integrates equipment into the control system thereby significantly reducing the susceptibility of the equipment to theft or dislocation by contact with the rider or foreign objects. Finally, it would be advantageous to provide an integrated rider control system that includes the features specified above and has an inherent aesthetically appealing appearance.

SUMMARY OF INVENTION

The present invention provides an integral rider control device for a handlebar steered vehicle. The integral rider control device includes an integral support structure having a left end for receiving a left handgrip and a right end for receiving a right handgrip opposed to the left handgrip. A plurality of non-tubular receptacles are formed in the integral support structure between the left and right ends. The receptacles are configured to receive a piece of equipment therein. The equipment may include controls, accessories or displays. The support structure further includes a central region disposed between the left and right ends. A connecting member pivotally couples the control device to the vehicle along a steering axis of the vehicle. The connecting member is molded into the central section, thereby reducing the number of parts, weight and assembly labor of the control device. In one embodiment of the invention, the support structure is formed by injection molding and is made of nylon with elastomeric modifiers.

The support structure may include upper and lower, substantially parallel spars formed within the integral support structure. The connecting member is insert-molded into the lower spar and pivotally coupled to the steering axis of the vehicle. The upper spar includes an elongate upward facing channel configured for receiving equipment and housing cable connected to the equipment. A cushionable cover is attachable to the upper spar to cover the channel and to protect the equipment and cables from moisture and debris.

Left and right mandrels outwardly project from the left and right ends of the support structure. Each mandrel is configured to receive a handgrip. The left and right ends include outwardly projecting cylindrical sidewalls. Each cylindrical sidewall includes serrated edges which are configured for engaging a device such as a brake lever, a gear shifter, a handgrip or integrated brake shifter.

These and other features and advantages of the invention will be more fully understood from the following description of a certain specific embodiment of the invention taken together with the accompanying drawings.

DETAILED DESCRIPTION

Figure 1:
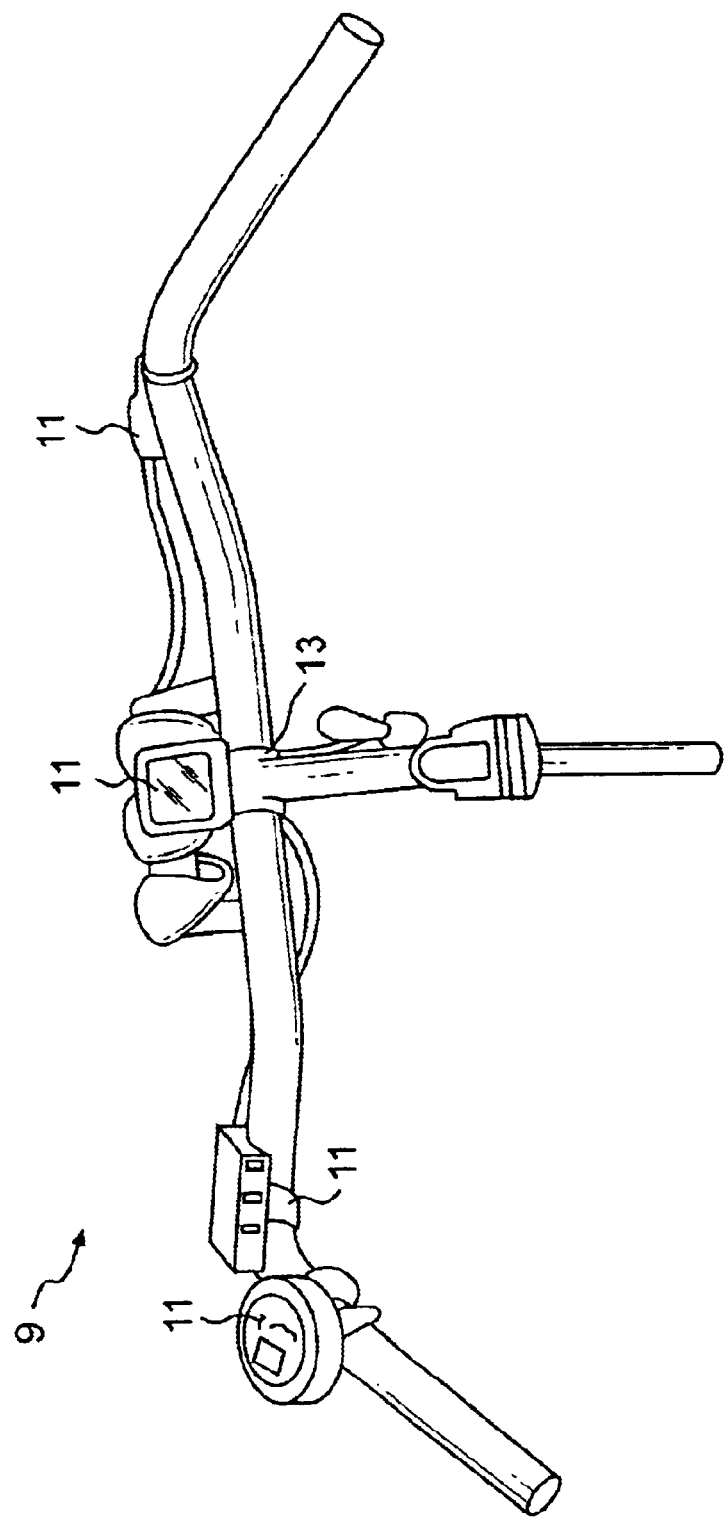
FIG. 1 is a top perspective view of a prior art bicycle handlebar assembly including a plurality of accessories and a connecting member.
Figure 2:
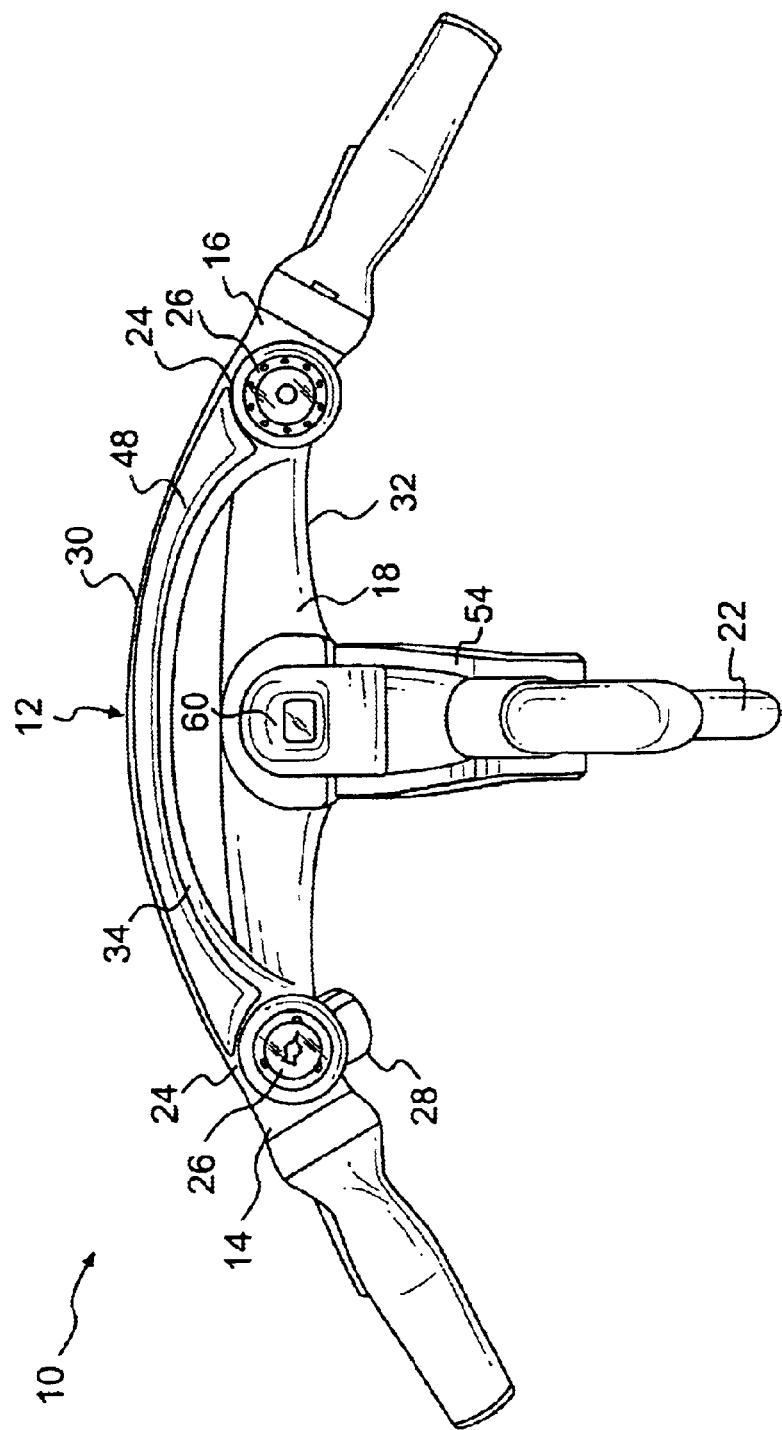
FIG. 2 is a top perspective view of an integrated rider control system in accordance with one embodiment of the present invention.

Referring to FIG. 2 of the drawings in detail, numeral 10 generally includes an integrated rider control device for a handlebar steered vehicles. Handlebar steered vehicles may include bicycles, motorcycles, personal watercrafts, mopeds, snowmobiles, etc. Rider control device 10 is configured to pivotally couple along a steering axis of the handlebar steered vehicle. In one embodiment of the present invention, the rider control device 10 generally includes an integral support structure 12 having a left end 14, a right end 16 opposite the left end 14 and a central section 18 disposed between the left and right ends 14, 16. A connecting member or clamp 20 connects the integral support structure 12 to a stem 22 of the vehicle. The stem 22 extends along the steering axis of the vehicle.

Integral support structure 12 is an elongate member. In one embodiment of the present invention, structure 12 includes a plurality of receptacles 24 for receiving equipment 26 therein. Structure 12 may also include mounting surfaces 28 for attaching equipment thereto. The receptacles and mounting surfaces 24, 28 allow for the equipment to be installed onto the structure 12 with a plurality of viewing aspects for the rider of the vehicle. The equipment may include accessories, controls or displays. The integral support structure 12 is manufactured by injection molding and made of impact, modified, glass-filled nylon. In one embodiment of the present invention, the support structure is made of fifty percent (50%) glass nylon with elastomeric impact modifiers.

Figure 3:
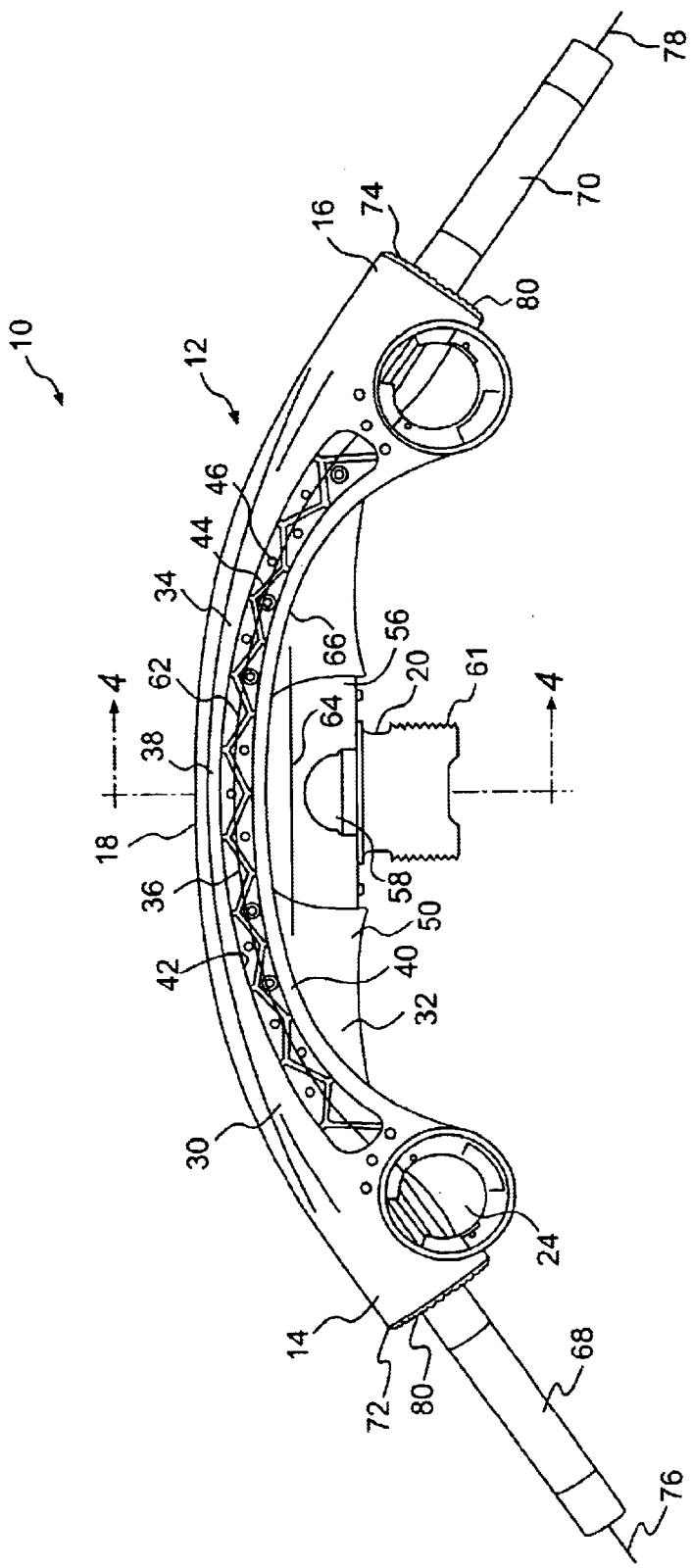
FIG. 3 is a top view of the integrated support structure of FIG. 2.

Referring to FIGS. 2 and 3, the central section 18 of the structure 12 may further include upper and lower spars 30, 32. The upper spar 30 is a generally planar elongate member. The upper spar 30 is integrally formed between the left and right ends 14, 16 and is superimposed with the lower spar 32 at the left and right ends 14, 16. Upper spar 30 has mounting surfaces 28 and receptacles 26 for attachment of and the routing of cables between the equipment. Upper spar 30 may include gripping surfaces 34 configured for grasping by the user during operation of the vehicle. A lower planar surface 36 and front and rear side surfaces 38, 40 of the upper spar 30 define an elongate channel 42 within the upper spar 30. A plurality of interconnecting trusses 44 and pins 46 upwardly extend from the lower surface 36. The trusses 44 increase the strength of the upper spar 30 and provide a passage for routing of cable between equipment within the upper spar 30. The internal routing of cables within the structure 12 eliminates or minimizes the risk of cables becoming entangled with a foreign object or the rider. Additionally, the integral routing of cables prevents moisture and debris from contacting the cables. A cushionable cover 48 is attachable to the upper spar 30 to cover the channel 42. The cover 48 prevents moisture from entering the channel 42 thereby protecting the cables.

Figure 4:
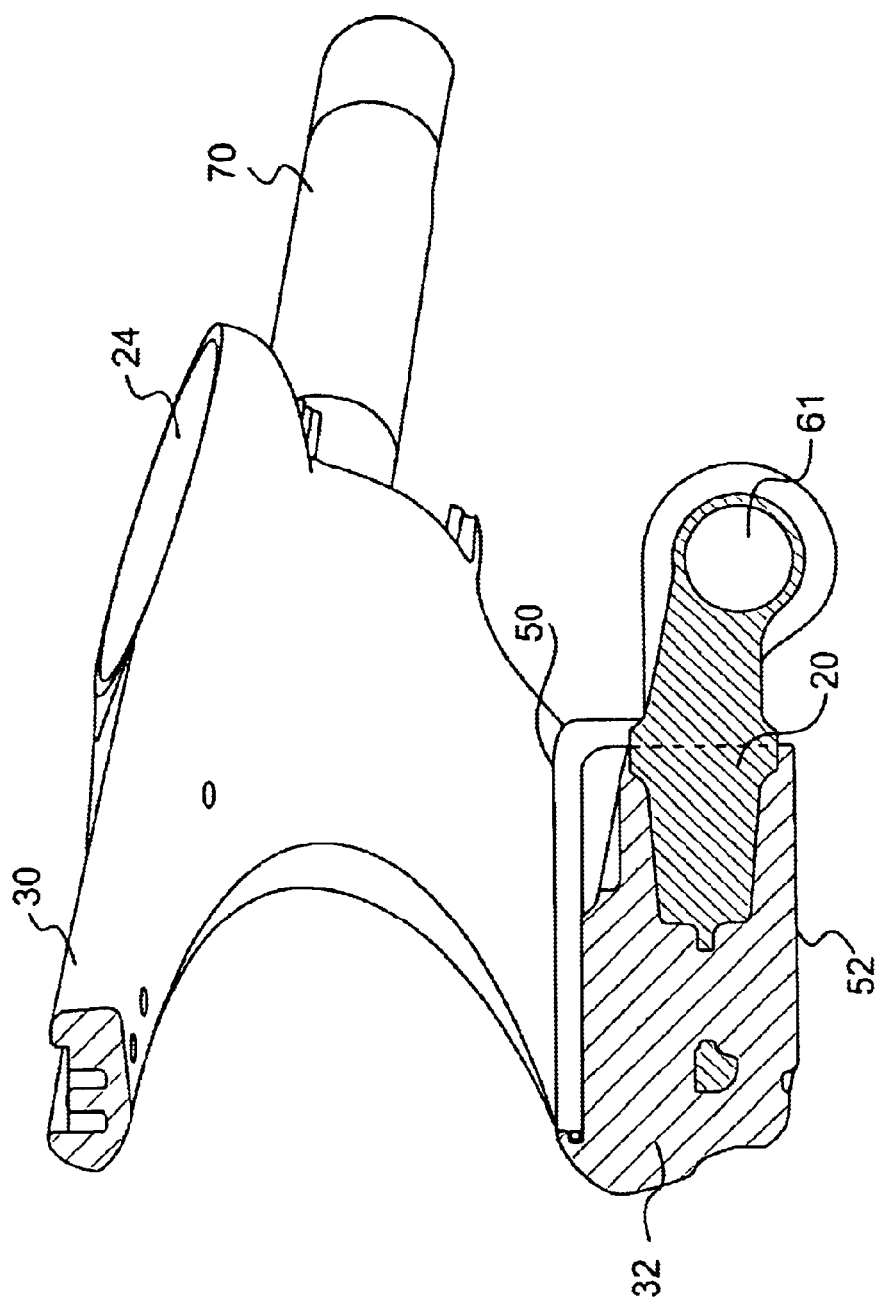
FIG. 4 is a cross-sectional view taken along line 4—4 of FIG. 3.

Referring to FIGS. 3 and 4, the lower spar 32 is a generally planar elongate member having a generally planar upper surface 50 and an arcuate lower surface 52. The lower spar 32 is configured to couple to an extension 54 (see FIG. 2). The lower spar 32 may includes channels which has trusses similar to the upper spar. The trusses strengthen the lower spar 32 and provide structured cable passages.

The upper surface 50 includes major and minor arcuate recesses 56, 58. The recesses 56, 58 are configured to partially receive and support a computer 60 (see FIG. 2). Referring to FIG. 4, the connecting member or clamp 20 is partially insert-molded into the central region of the lower spar 32. The clamp 20 also outwardly extends from the lower spar and is connected to the extension 54 by bolts (not shown) extending through hole 61. The clamp may be made from aluminum. By the clamp being insert-molded into the lower spar, the number of parts, weight and assembly labor of the control device 10 are reduced.

Referring to FIG. 3, the upper and lower spars 30, 32 each have an upper and lower centerline 62, 64. The upper spar centerline 62 is positioned forward of the lower spar centerline 64. The upper spar 30 further includes a rear margin 66. Rear margin 66 is positioned such that the rider positioned in a typical semi-upright riding position can view upper surface 50 of the lower spar 32. A typical riding position is one where the rider's torso is positioned in an upright position or in a forward bent or forward leaning position where the rider's eyes are positioned rearward and above the structure 12. The upper spar 30 is positioned further forward than the lower spar 32 such that the upper spar 30 will not occlude the rider's vision of the display or displays positioned on the lower spar 32. When the hands of the rider grip the upper spar 30, the head of the rider will be closer to the lower spar 32 than would otherwise occur in single-tube handlebar systems.

Each end 14, 16 is integrally formed to the upper and lower spars 30, 32. Left and right mandrels 68, 70 extend from the left and right ends 14, 16, respectively. Left and right ends have outwardly projecting left and right cylindrical sidewalls 72, 74, respectively. The cylindrical sidewalls 72, 74 extend along axes substantially parallel to longitudinal axes 76, 78 of the left and right mandrels 68, 70, respectively. Sidewalls 72, 74 may be formed of non-annular shapes such as rectangular, oval, etc. The edges of the sidewalls 72, 74 has a plurality of outwardly and axially projecting detents 80 extending substantially around the perimeter of the edges. The sidewalls 72, 74 are configured to contact a mandrel attachment such as brake levers, gear shifters, integrated brake gear shifters, hand grips, etc. In one embodiment of the present invention, the detents 80 engage the mandrel attachments to facilitate the rotational positioning of the mandrel attachment about the mandrel.

The control device 10 provides an integrated, modular and adjustable steering control platform. The device provides a completely new vehicle defining aesthetic, enhances the ergonomic fit of the rider to the vehicle, enhances the ergonomic function and accessibility of the equipment, such as controls, accessories and displays, and provides upgradeability with modular, fully integrated controls, accessories and accessory controls.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed is:

1. An integral rider control device for a handlebar steered vehicle, said device comprising:

an integral support structure including a left end having an outwardly projecting left mandrel for receiving a left handgrip and a right end having an outwardly projecting right mandrel for receiving a right handgrip opposed to the left handgrip, at least one of the left and right ends including an outwardly projecting cylindrical sidewall having substantially serrated left and right edges, respectively, the left and right edges configured for engaging one of a brake lever, a gear shifter, an actuator grip, a handgrip and an integrated brake shifter;

a plurality of non-tubular receptacles formed in the integral support structure between the left end and the right end thereof, the receptacles each configured to receive a piece of equipment selected from a group consisting of controls, displays and accessories;

a central section of the support structure disposed between the left and right ends; and a connecting member molded into the central section and outwardly projecting from the central section, said connecting member pivotally coupled to the vehicle along a steering axis of the vehicle.

2. The integral rider control device of claim 1 wherein the integral support structure is made of nylon with elastomeric modifiers.

3. The integral rider control device of claim 1 wherein the integral support structure is formed by injection molding.

4. The integral rider control device of claim 1 wherein the connecting member is insert-molded into the central section of the support structure.

5. The integral rider control device of claim 1 wherein the connecting member is made of metal.

6. The integral rider control device of claim 1 wherein the integral support structure includes at least one cable passage extending through at least a portion of the integral support structure, the cable passage configured to provide a connection path between at least two pieces of equipment.

7. The integral rider control device of claim 1 wherein the at least one receptacle receives an indicator positioned near to one of the left and right ends.

8. The integral rider control device of claim 1 wherein the integral support structure includes upper and lower, substantially parallel spars, the connecting member molded into the lower spar.

9. The integral rider control device of claim 8 wherein the upper spar includes an elongate upward facing channel configured for receiving equipment and housing cable and a cushionable member attached to the upper spar for substantially covering the elongate upward facing channel.

10. At integral rider control device for a handlebar steered vehicle, said device comprising:

a one-piece integral support structure having a left end for receiving a left handgrip and a right end for receiving a right handgrip opposed to the left handgrip;

a plurality of non-tubular receptacles formed in the integral support structure between the left end and the right end thereof, the receptacles each configured to receive a piece of equipment selected from a group consisting of controls, displays and accessories;

a central section of the support structure disposed between the left and right ends, the central section having an upper spar and a lower spar, the upper spar disposed vertically relative to the lower spar; and a connecting member molded into the lower spar and outwardly projecting from the lower spar, said connecting member pivotally coupled to the vehicle along a steering axis of the vehicle.

11. The integral rider control device of claim 10 wherein the integral support structure is made of nylon with elastomeric modifiers.

12. The integral rider control device of claim 10 wherein the integral support structure is formed by injection molding.

13. The integral rider control device of claim 10 wherein the connecting member is insert-molded into the lower spar.

14. The integral rider control device of claim 10 wherein the connecting member is made of metal.

* * * * *